United States Patent
McCrackin et al.

(10) Patent No.: US 12,152,998 B2
(45) Date of Patent: Nov. 26, 2024

(54) EROSION DETECTION AND PREDICTION

(71) Applicant: Baker Hughes Holdings LLC, Houston, TX (US)

(72) Inventors: Sheldon McCrackin, Houston, TX (US); Carlneil Domkam, Houston, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 295 days.

(21) Appl. No.: 17/716,565

(22) Filed: Apr. 8, 2022

(65) Prior Publication Data

US 2022/0341854 A1 Oct. 27, 2022

Related U.S. Application Data

(60) Provisional application No. 63/178,509, filed on Apr. 22, 2021.

(51) Int. Cl.
*G01N 21/954* (2006.01)
*G02B 23/24* (2006.01)
*G06T 7/136* (2017.01)

(52) U.S. Cl.
CPC ....... *G01N 21/954* (2013.01); *G02B 23/2423* (2013.01); *G06T 7/136* (2017.01); *G06T 2207/20081* (2013.01)

(58) Field of Classification Search
CPC .. G01N 21/954; G02B 23/2423; G06T 7/136; G06T 2207/20081
See application file for complete search history.

(56) References Cited

U.S. PATENT DOCUMENTS 5,864,601 A 1/1999 Cattorini et al.
9,049,433 B1 * 6/2015 Prince ............... G06T 7/001
(Continued)

FOREIGN PATENT DOCUMENTS

JP 2015078895 A 4/2015
WO 2020047469 A2 3/2020

OTHER PUBLICATIONS

Wong et al., "Automatic Borescope Damage Assessments For Gas Turbine Blades Via Deep Learning," arXiv preprint arXiv:2103.05430, Feb. 23, 2021 [retrieved on Aug. 5, 2021] Retrieved from the Internet <URL: https://arxiv.org/pdf/2103.05430.pdf> (17 pages).
(Continued)

*Primary Examiner* — Hung V Nguyen
(74) *Attorney, Agent, or Firm* — Mintz, Levin, Cohn, Ferris, Glovsky and Popeo, P.C.

(57) ABSTRACT

An inspection system is provided and includes a camera and controller. The camera can acquire at least one image of a target including opposed first and second surfaces. The controller can be in communication with the camera and receive the at least one image. The controller can also detect, using at least one computer vision algorithm, a geometry of the target including the first target surface and the second target surface of the target within at least one image. The at least one image can be acquired at a respective time under respective operating conditions. The controller can additionally segment erosion within the at least one image using the at least one computer vision algorithm. The controller can also generate an erosion depth profile for the at least one image. The erosion depth profile can characterize a depth of erosion of the target between the first and second surfaces.

18 Claims, 5 Drawing Sheets

(56) References Cited

U.S. PATENT DOCUMENTS

| | | |
|---|---|---|
| 10,197,473 B2 | 2/2019 | Diwinsky et al. |
| 10,262,243 B2 | 4/2019 | Lim et al. |
| 10,268,913 B2 | 4/2019 | Lim et al. |
| 10,746,670 B2 * | 8/2020 | Safai .................... G06T 7/001 |
| 2002/0128790 A1 | 9/2002 | Woodmansee |
| 2003/0198374 A1 * | 10/2003 | Hagene ............... G01N 21/954 |
| | | 382/141 |
| 2015/0226660 A1 | 8/2015 | Agnihotram et al. |

OTHER PUBLICATIONS

International Search Report and Written Opinion of International Application No. PCT/US2022/071798 mailed Aug. 3, 2022, 9 pages.

* cited by examiner

```
┌─────────────────────────────────────────────────────────────────┐
│ Capturing, by a camera of an inspection system, at least one   │
│ image of a target, the target including opposed first and      │
│ second surfaces,                                                │
│                          202                                    │
└─────────────────────────────────────────────────────────────────┘
                                │
                                ▼
┌─────────────────────────────────────────────────────────────────┐
│ Receiving, by one or more processors in communication with the │
│ camera, the at least one image,                                 │
│                          204                                    │
└─────────────────────────────────────────────────────────────────┘
                                │
                                ▼
┌─────────────────────────────────────────────────────────────────┐
│ Detecting, by one or more processors using at least one        │
│ computer vision algorithm, a geometry of the target including  │
│ the first surface of the target and the second surface of the  │
│ target within at the least one image, where the at least one   │
│ image is acquired at a respective time under respective        │
│ operating conditions,                                           │
│                          206                                    │
└─────────────────────────────────────────────────────────────────┘
                                │
                                ▼
┌─────────────────────────────────────────────────────────────────┐
│ Segmenting, by the one or more processors using the at least   │
│ one computer vision algorithm, erosion within the at least one │
│ image,                                                          │
│                          210                                    │
└─────────────────────────────────────────────────────────────────┘
                                │
                                ▼
┌─────────────────────────────────────────────────────────────────┐
│ Generating, by the one or more processors, an erosion depth    │
│ profile for the at least one image, the erosion depth profile  │
│ characterizing a depth of erosion of the target between the    │
│ first and second surfaces,                                      │
│                          212                                    │
└─────────────────────────────────────────────────────────────────┘
                                │
                                ▼
┌─────────────────────────────────────────────────────────────────┐
│ Outputting, by the one or more processors, the generated       │
│ erosion depth profile,                                          │
│                          214                                    │
└─────────────────────────────────────────────────────────────────┘
```

EROSION DETECTION AND PREDICTION

CROSS-REFERENCE TO RELATED APPLICATIONS

This application claims the benefit of U.S. Provisional Patent Application No. 63/178,509, filed on Apr. 22, 2021, and entitled "Erosion Detection and Prediction," the entirety of which is incorporated by reference.

BACKGROUND

Certain equipment and facilities, such as power generation equipment and facilities, oil and gas equipment and facilities, aircraft equipment and facilities, manufacturing equipment and facilities, and the like, include interrelated systems and processes. For example, power generation plants can include turbine systems and processes for operating and maintaining the turbine systems. Likewise, oil and gas operations can include carbonaceous fuel retrieval systems and processing equipment interconnected via pipelines. Similarly, aircraft systems can include airplanes and maintenance hangars useful in maintaining airworthiness and providing for maintenance support. During equipment operations, the equipment can degrade, encounter undesired conditions such as corrosion, wear and tear, etc., potentially affecting overall equipment effectiveness. Certain inspection techniques, such as non-destructive inspection techniques or non-destructive testing (NDT) techniques, can be used to detect undesired equipment conditions.

SUMMARY

NDT devices can be used to observe the inner mechanisms of complex machines, such as turbines and oil and gas equipment. As an example, NDT devices such as borescopes endoscopes, etc. can be fed through these complex machines to perform maintenance checks without dismantling the whole machine. Such NDT devices can be actuated (e.g., translated, rotated, bent, etc.) in order to maneuver through small openings of these complex machines to allow inspection of these inner components. Acquired NDT inspection data, analysis of the acquired NDT inspection data, storage and/or display of the acquired and analyzed NDT inspection data can be performed by the NDT device, display another computing device, or combinations thereof.

As an example, components of fuel nozzles within gas turbine engines can be inspected by NDT devices. Fuel nozzles are designed to distribute a metered amount of fuel into a combustor of the gas turbine engine. However, components of the fuel nozzles, such as heat shields, can experience damage (e.g., erosion) over time and impair the operation of the fuel nozzle. Taken in the context of a combustor including multiple fuel nozzles, damaged fuel nozzles can result in imbalanced fuel distribution and hot and cold spots (temperature gradients) within the combustor. The cold spots can create problems such as increased $NO_x$ and CO emissions due to incomplete combustion, while hot spots can decrease creep life. Thus, inspection of fuel nozzles is desirable to characterize erosion (e.g., detect and quantify) so that preventative maintenance can be performed to avoid these problems.

Detection and quantification of erosion in components of fuel nozzle assemblies is currently performed by manual inspection of images acquired during inspection. However, manual inspection is inherently subjective and subject to variance between different inspectors, as well as human error. Furthermore, manual inspection can require that the images are acquired nominally perpendicular to the target surface to avoid distortion of features and attendant errors in characterization of erosion.

Accordingly, embodiments of the present disclosure provide improved systems and methods for characterization of erosion. As discussed in detail below, an NDT device, such as a borescope, can acquire a single image or a plurality of images of a target, such as a heat shield of a fuel nozzle assembly. The acquired image(s) can be used as input to one or more computer vision algorithms executed by at least one processor of the NDT device or that is in communication with the NDT device via a network. The computer vision algorithms (e.g., traditional computer vision algorithms or deep learning algorithms) can be employed to analyze respective captured images of the target, thereby automating detection and quantification of erosion.

In further embodiments, one or more machine learning algorithms can be used to predict the evolution of erosion over time. As an example, the at least one computer vision algorithm can be used to detect and quantify erosion within at least two images acquired at different times and generate respective erosion depth profiles for least two images. These erosion depth profiles and corresponding operating conditions of the target can be used as inputs to the machine learning algorithm to generate a predicted erosion depth profile at a predetermined future time.

In an embodiment, an inspection system is provided and can include a camera and a controller. The camera can be configured to acquire at least one image of a target. The target can include opposed first and second surfaces. The controller can include one or more processors in communication with the camera. The controller can be configured to receive the at least one image. The controller can be further configured to detect, using at least one computer vision algorithm, a geometry of the target including the first surface of the target and the second surface of the target within at least one image. The at least one image can be acquired at a respective time under respective operating conditions. The controller can be further configured to segment erosion within the at least one image using the at least one computer vision algorithm. The controller can also be configured to generate an erosion depth profile for the at least one image. The erosion depth profile can characterize a depth of erosion of the target between the first and second surfaces. The controller can be further configured to output the generated erosion depth profile.

In another embodiment, the at least one image can be at least two images including a first image acquired at a first time under first operating conditions and a second image acquired at a second time under second operating conditions, and the second time is after the first time. The controller can be further configured to detect, using the at least one computer vision algorithm, the geometry of the target within the at least two images. The controller can also be configured to segment erosion within the at least two images, using the at least one computer vision algorithm. The controller can also be configured to generate an erosion depth profile for the at least two images.

In another embodiment, the controller can be further configured to receive the first and second operating conditions. The controller can also be configured to generate an erosion depth profile prediction at a third time after the second time using a machine learning algorithm based upon respective erosion depth profiles of the at least two images and their corresponding operating conditions. The erosion depth profile can characterize a predicted depth of erosion between the first and second surfaces. The controller can also be configured to output the erosion depth profile prediction.

In another embodiment, the controller can be further configured to receive a predetermined threshold depth characterizing an erosion failure. The controller can also be configured to compare the generated erosion depth profile for the at least one image to the threshold depth. The controller can additionally be configured to output an alarm or indication when the generated erosion depth profile is greater than the predetermined threshold depth.

In another embodiment, the target can include a substrate and a coating positioned on the target. The controller can be further configured to segment erosion of the coating and the substrate.

In another embodiment, the target can be a heat shield of a fuel nozzle, the first surface can be an outer diameter of the heat shield, and the second surface can be an inner diameter of the heat shield.

In another embodiment, the computer vision algorithm is not a deep learning algorithm. The computer vision algorithm can be configured to perform at least one of feature extraction, thresholding, or edge detection.

In another embodiment, the computer vision algorithm can be a deep learning algorithm. The deep learning algorithm can be configured to perform at least one of object detection, semantic segmentation, or instance segmentation.

In another embodiment, the system can include a borescope including the camera and the controller.

In another embodiment, a method of inspecting a target is provided. The method can include capturing, by a camera of an inspection system, at least one image of a target. The target can include opposed first and second surfaces. The method can further include receiving by one or more processors in communication with the camera, the at least one image. The method can further include detecting, by the one or more processors using at least one computer vision algorithm, a geometry of the target including the first surface of the target and the second surface of the target within at least one image. The at least one image can be acquired at a respective time under respective operating conditions. The method can also include segmenting, by the one or more processors using the at least one computer vision algorithm, erosion within the at least one image. The method can additionally include generating, by the one or more processors, an erosion depth profile for the at least one image. The erosion depth profile can characterize a depth of erosion of the target between the first and second surfaces. The method can additionally include outputting, by the one or more processors, the generated erosion depth profile.

In another embodiment, the at least one image is at least two images including a first image acquired at a first time under first operating conditions and a second image acquired at a second time under second operating conditions and the second time is after the first time. The method can further include detecting, by the one or more processors using the at least one computer vision algorithm, the geometry of the target within the at least two images. The method can further include segmenting, by the one or more processors using the at least one first computer vision algorithm, erosion within the at least two images. The method can additionally include generating, by the one or more processors, an erosion depth profile for the at least two images.

In another embodiment, the method can further include receiving, by the one or more processors, the first and second operating conditions. The method can also include generating, by the one or more processors, an erosion depth profile prediction at a third time after the second time using a machine computer vision algorithm, based upon the erosion depth profile of the at least two images and their corresponding operating conditions. The erosion depth profile prediction can characterize a predicted depth of erosion between the first and second surfaces. The method can additionally include outputting the erosion depth profile prediction.

In another embodiment, the method can further include receiving, by the one or more processors, a predetermined threshold depth characterizing an erosion failure. The method can also include comparing, by the one or more processors, the generated erosion depth profile for each of the at least one image to the threshold depth. The method can additionally include outputting, by the one or more processors, an alarm or indication when the generated erosion depth profile is greater than the predetermined threshold depth.

In another embodiment, the target can include a substrate and a coating positioned on the target. The method can further include segmenting, using the at least one computer vision algorithm, erosion of the coating and the substrate.

In another embodiment, the target can be a heat shield of a fuel nozzle, the first surface can be an outer diameter of the heat shield, and the second surface can be an inner diameter of the heat shield.

In another embodiment, the computer vision algorithm is not a deep learning algorithm. The computer vision algorithm can be configured to perform at least one of feature extraction, thresholding, or edge detection.

In another embodiment, the computer vision algorithm can be a deep learning algorithm configured to perform at least one of object detection, semantic segmentation, or instance segmentation.

In another embodiment, the inspection device can be a borescope including the camera and the controller.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Inspection devices are commonly used in order to detect features of interest, such as erosion of a component, within industrial machines. As an example, an inspection device can include a camera that takes pictures of a target portion of a machine, and these pictures can be manually analyzed to detect erosion. Following erosion detection, preventative maintenance (e.g., repair, replacement, etc.) can be performed on components before problems develop, such as reduced performance, shutdown, catastrophic failure, and/or worker injury. However, manual analysis of erosion is subjective, prone to error, and time consuming.

Embodiments of the present disclosure provide inspection systems and corresponding methods which remedy these limitations. As discussed in greater detail below, an inspection system can include an inspection device (e.g., a borescope) that captures images of a target over time during an inspection and employs computer vision algorithms to detect and quantify features of interest, such as erosion within respective images. As an example, an erosion depth profile can be generated for at least one images that characterizes depth of erosion as a function of position within the target. In further embodiments, multiple erosion depth profiles can be generated from images acquired at different times. These erosion depth profiles, along with corresponding operating conditions, can be employed as inputs to at least one machine learning algorithm configured to predict erosion depth profiles at future times. Beneficially, erosion detection and characterization can be automated and standardized, rather than relying upon subjective manual analysis, reducing the occurrence of inspection errors such as false positives or negatives. Furthermore, erosion depth predictions can be used to determine optimal inspection intervals. In this manner, the need to repeat erroneous inspections and/or the frequency of inspections can be reduced, optimizing the use of inspection resources and decreasing the cost of inspection.

Embodiments of sensing systems and corresponding methods are discussed herein in the context of non-destructive inspection devices such as borescopes. Additionally, reference is made to inspection of targets such as fuel nozzle components (e.g., heat shields). However, it can be appreciated that embodiments of the disclosure are not limited to non-destructive inspection devices or specific inspection targets and can be employed with other inspection devices and targets without limit.

Figure 1:
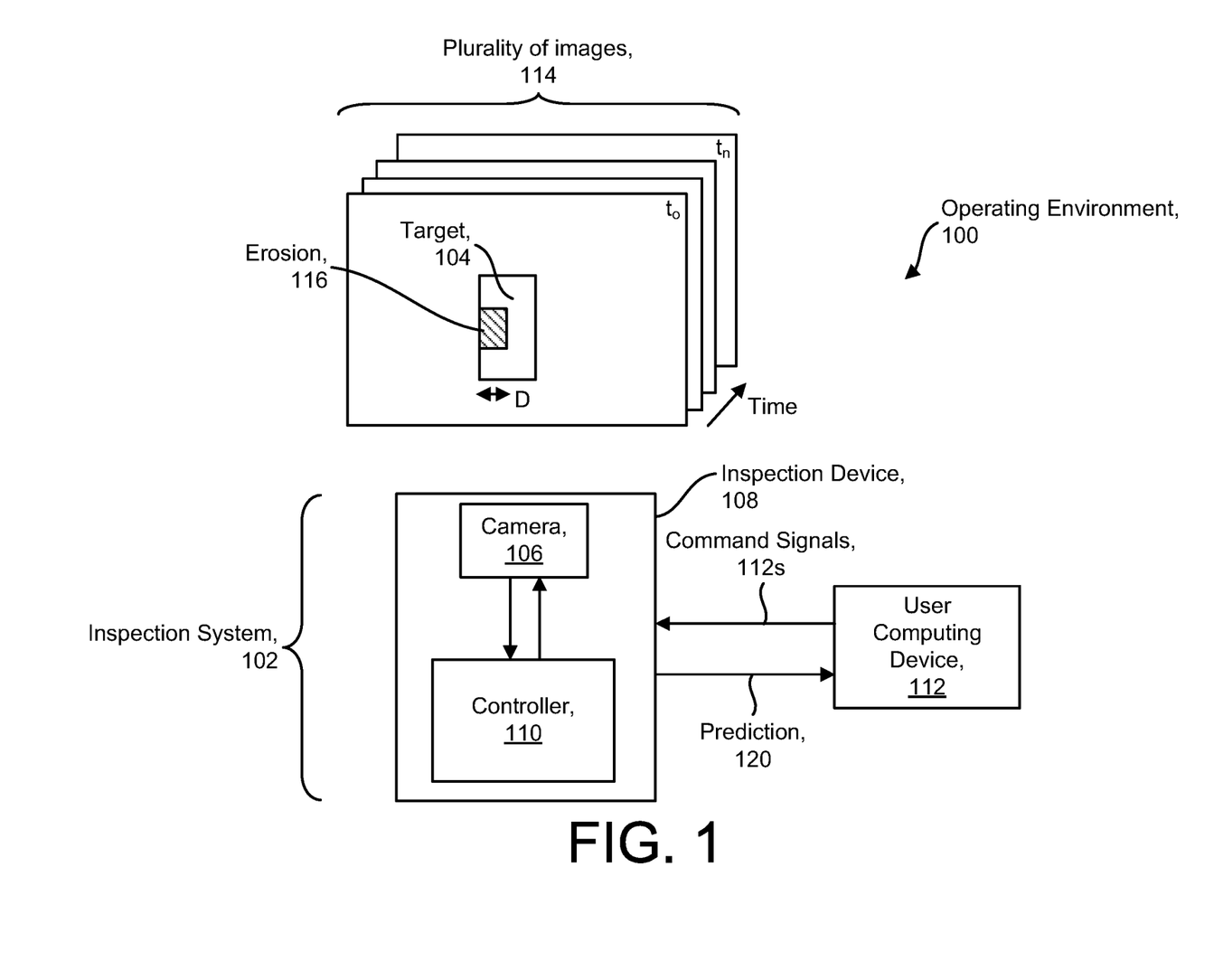
FIG. 1 is a schematic diagram illustrating one exemplary embodiment of an operating environment including an inspection device having a camera configured to capture images of a target and a controller configured to analyze the captured images.

FIG. 1 is a schematic block diagram illustrating one exemplary embodiment of an operating environment 100 including an inspection system 102 and a target 104. As shown, the inspection system 102 includes an inspection device 108 and a user computing device 112). The inspection device 108 can include a camera 106 and a controller 110. The controller 110 can be in communication with the camera 106 and the user computing device 112. While the user computing device and the inspection device are illustrated as separate components in FIG. 1, in alternative embodiments they can be integrated.

The controller 110 can be configured to transmit one or more command signals 112s to the inspection device 108. The command signals 112s can be operative to command at least one of the camera 106, the at least one sensor, and other components of the inspection device and/or the target not shown (e.g., articulating components), to perform one or more operations as part of an inspection. Such operations can be performed automatically (e.g., in a scripted sequence), manually in response to commands received from the user computing device 112 (e.g., commands entered by a human inspector), adaptive operations control (e.g., subsequent operations executed based upon information received from previous operations), and combinations thereof. Examples of the inspection operations can include, but are not limited to, movement of the target 104, movement of the camera 106, illumination of the target 104 acquisition of at least one image (e.g., a single image or selected images of a plurality of images 114) of the target 104 by the camera 106, analysis of the at least one acquired image, output of analysis results (e.g., to the user computing device 112 for storage and/or display), and the like.

In an embodiment, the target 104 can be a component of a fuel nozzle assembly, such as a heat shield. In further embodiments, at least a portion of the inspection system 102 (e.g., a component of the inspection device 108 such as the camera 106) can be configured for placement within or adjacent to the target 104. In additional embodiments, the inspection device 108 can be a non-destructive testing device, such as a borescope. An exemplary embodiment of a borescope is discussed in U.S. Patent Publication No. 2019/0331613, the entirety of which is incorporated by reference herein. It can be appreciated, however, that in alternative embodiments, the inspection system can include other inspection devices including a camera and computing capability to execute computer vision algorithms and/or machine learning algorithms without limit.

Embodiments of the camera 106 can be configured to acquire the at least one image (e.g., plurality of images 114) continuously throughout inspection of the target 104, or during a selected portion of an inspection. In one aspect, the camera can be a video camera and the plurality of images can be successive frames of video recorded by the camera. In another aspect, the camera can be a still camera and the plurality of images can be a time ordered sequence of still images.

The controller 110 can be configured to receive the at least one image (e.g., a single image or an image selected from the plurality of images 114) from the camera 106 and execute one or more computer vision (CV) algorithms using the single image or selected images of the plurality of images 114 as input. As discussed in greater detail below, the CV algorithm(s) can be configured to detect and quantify at least one feature of interest regarding the target 104, such as an erosion depth profile of the target. The erosion depth profile can characterize a depth D of erosion 116 as a function of position within the target 104 (e.g., distance from a predetermined surface).

Optionally, the controller 110 can be further configured to generate an erosion prediction regarding the target 104 using at least one machine learning algorithm (e.g., algorithms in the space of computer vision, deep learning, and or data science). As discussed in greater detail below, erosion depth profiles can be generated for at least two images acquired at different times. The machine learning algorithms can employ the erosion depth profiles for the at least two images and corresponding operating conditions of the target 104 as inputs.

In some embodiments, the controller 110 can generate erosion depth profiles and predictions for all or substantially all of the plurality of images 114 using the CV algorithms and machine learning algorithms. In one aspect, substantially all of the plurality of images can be a relatively high fraction of the total number of the plurality of images (e.g., greater than or equal to about 90%, 91%, 92%, 93%, 94%, 95%, 96%, 97%, 98%, 99%, etc.) In another aspect, substantially all of the plurality of images can be a number of images of the plurality of images such that temporally adjacent images are separated in time by less than a predetermined time interval.

Using CV algorithms for detection and quantification of erosion depth profiles can provide a variety of benefits. In one aspect, the accuracy of the erosion depth profiles can be improved, as analysis of images is not influenced by subjective determinations. In a further aspect, because the erosion detection and quantification is not reliant upon subjective determinations, inspection can be performed by less experienced inspectors.

In an additional aspect, CV algorithms can be configured to adjust the captured images to account for deviations of the camera orientation with respect to the target and lighting ideal conditions. As an example, manual erosion analysis can require that the camera is nominally perpendicular to the plane of the target and illuminated under predetermined lighting conditions to avoid the display of artifacts (e.g., skew, shadows, etc.) that can be misinterpreted and introduce errors into detection and quantification of erosion. In this manner, the plurality of images 114 can be captured with greater flexibility in the lighting and camera positioning.

It can be further advantageous to predict erosion depth at future times, based upon prior inspection data (e.g., erosion depth profiles) for the target 104. In this manner, the erosion depth predictions can allow for creation of maintenance plans that are tailored to the specific target (predictive maintenance).

In certain embodiments, the computer vision algorithm(s) and machine learning algorithm(s) can be solely executed by the inspection device (e.g., the controller, alone or in combination with any other computing resources of the inspection device). That is, the inspection device does not output the at least one image or plurality of images for analysis by another computing device. This configuration can be beneficial for embodiments of the inspection system that are not in communication with cloud-based computing resources via a network. In one aspect, local analysis performed by the inspection device alone can exhibit low to approximately zero latency, as there is no reliance on network bandwidth. As a result, the object of interest can be found in real-time, allowing the operator of the inspection device to make decisions faster. In another aspect, the security of data generated during analysis of the image(s) is improved, as this data is maintained on the inspection device and not transmitted over a network where it can be exposed.

However, it can be appreciated that, in alternative embodiments, the inspection device can output one or more images acquired by the inspection device to an external computing device. The external computing device can thus be configured to execute the CV algorithm(s) for erosion detection and quantification and/or the machine learning algorithm(s) to generate predictions.

Figure 2A:
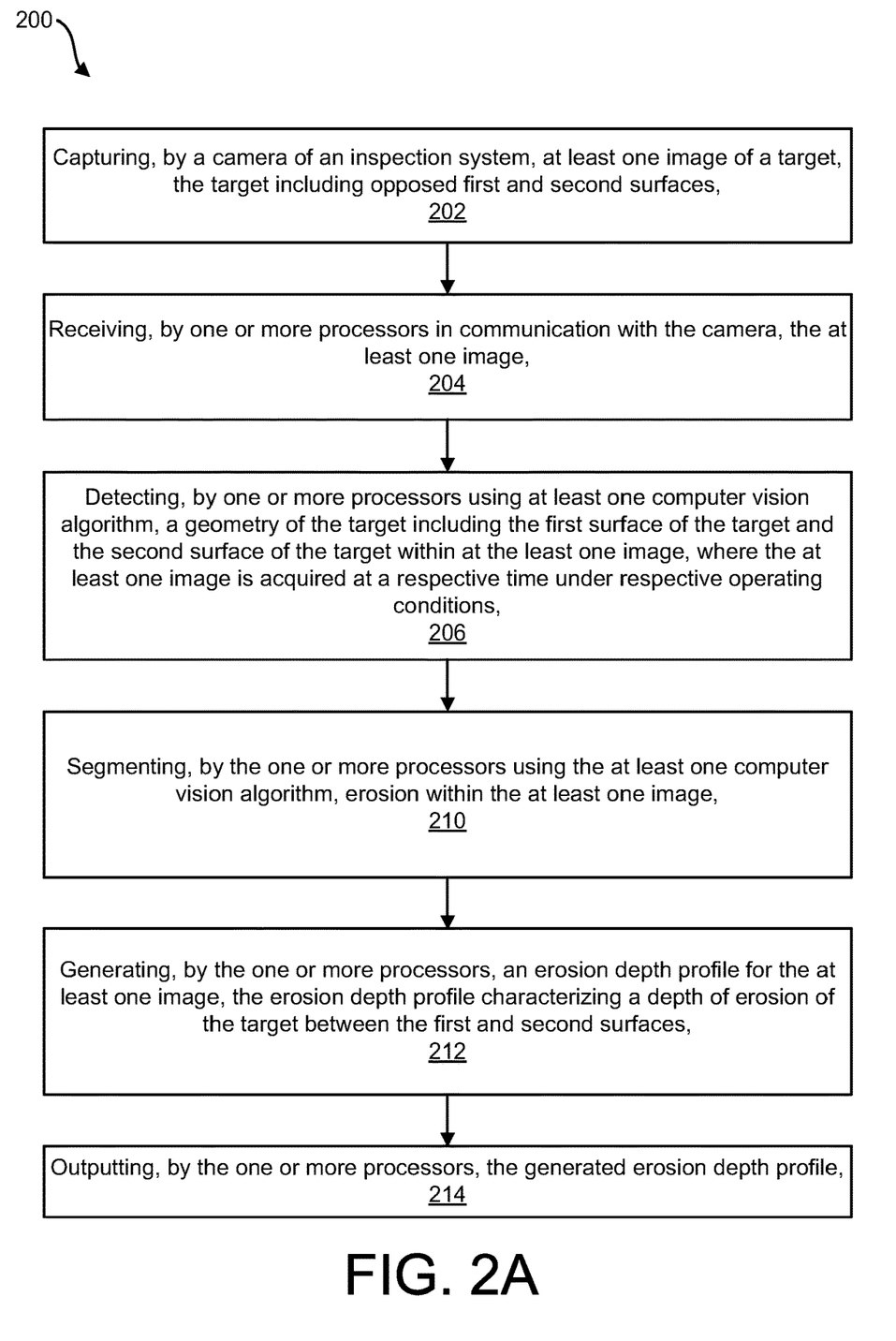
FIG. 2A is a flow diagram illustrating one exemplary embodiment of a method of inspecting a target employing at least one computer vision algorithm.
Figure 2B:
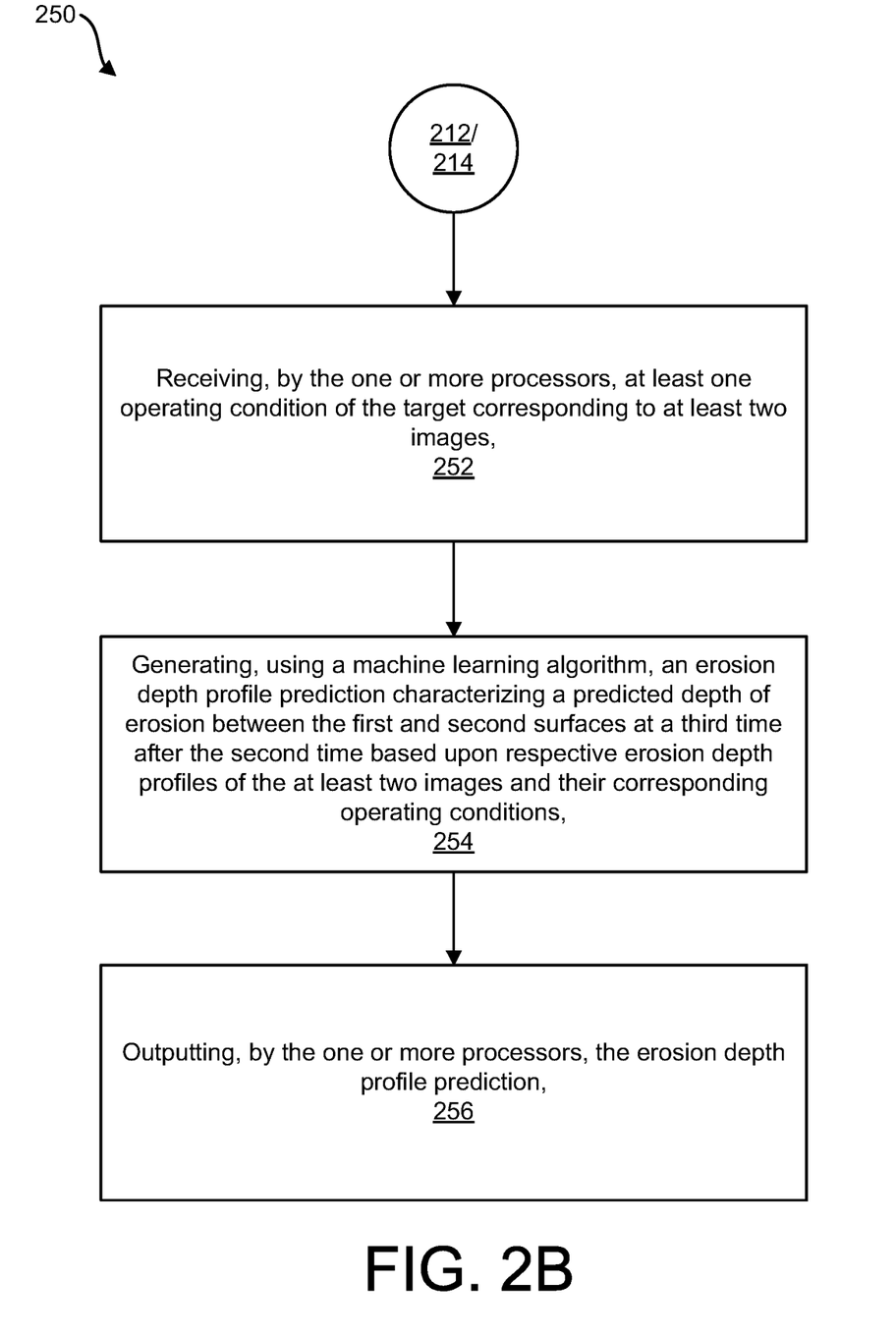
FIG. 2B is a flow diagram illustrating one exemplary embodiment of a method of predicting erosion of the target employing at least one machine learning algorithm.

A flow diagram illustrating an embodiment of a method 200 for inspection of the target 104 (e.g., erosion detection and quantification) is illustrated in FIG. 2A. As shown, the method 200 includes operations 202-214. A flow diagram illustrating an embodiment of a method 250 for erosion prediction based upon the erosion quantification (e.g., erosion depth profiles) generated by the method 200 is illustrated in FIG. 2B. As shown, the method 250 includes operations 252-256. The methods 200, 250 are discussed in detail below with reference to FIGS. 3A-4 and can be performed by the inspection device 108. It can be appreciated that alternative embodiments of the methods 200, 250 can include greater or fewer operations than illustrated in FIGS. 2A, 2B and the operations can be performed in an order different than FIGS. 2A-2B.

Figure 3A:
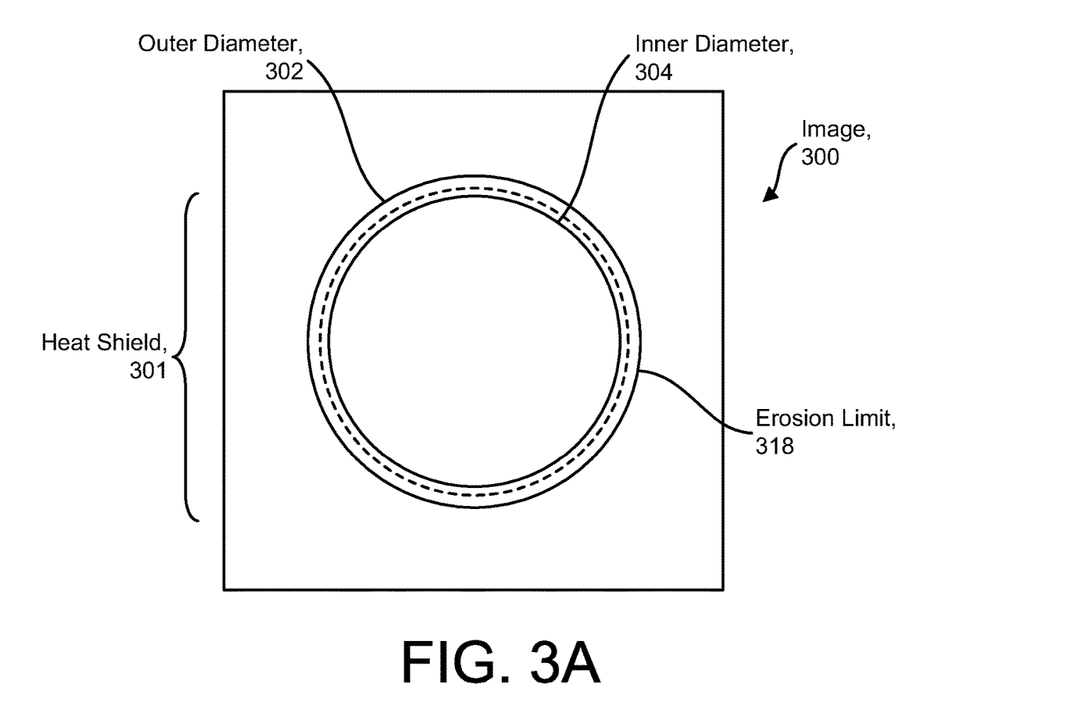
FIG. 3A is a schematic diagram illustrating one exemplary embodiment of an image including a target (e.g., a heat shield of a fuel nozzle) captured by the camera of the inspection device of FIG. 1.

In operation 202, the camera 106 of the inspection device 108 can capture at least one image (e.g., a single image or the plurality of images 114 of the target 104 over time) during the inspection. In certain embodiments, the inspection device 108 can be a borescope. When the camera is a video camera, the single image or plurality of images 114 can be a frame or sequential frames, respectively, extracted from a video captured by the camera. When the camera is a still camera, the plurality of images 114 can be a time ordered sequence of still images. As discussed herein, a single image can be captured at a predetermined time (e.g., time $t_0$ while the plurality of images 114 can include respective images captured at different predetermined times (e.g., $t_0, t_1, \ldots t_n$, etc.) In certain embodiments, a time interval between respective images of the plurality of images 114 can be approximately constant. ,k FIG. 3 is a schematic diagram illustrating one exemplary embodiment of an image 300 acquired by the camera 106. As shown, the image 300 includes the target 104 in the form of a heat shield 301 of a fuel nozzle. The heat shield 301 is generally annular, including opposed surfaces in the radial direction (e.g., outer diameter 302 and an inner diameter 304). The heat shield 301 can further include a substrate upon which a coating (e.g., a thermal barrier coating or TBC) is deposited.

In operation 204, one or more processors of the inspection system 102 (e.g., the controller 110) can receive the at least one image. In certain embodiments, the at least one image and the motion data can be received by the controller substantially immediately (e.g., within about 100 ms or less) after acquisition by the camera and the at least one sensor. In this manner, analysis of the at least one image can be performed substantially in real-time. However, in other embodiments, the at least one image and the motion data can be stored in a memory after capture (e.g., a memory of the controller, the user computing device, a remote computing device, etc.) and subsequently retrieved by the controller at a later time for analysis.

In operation 206, the controller 110 can employ at least one CV algorithm to detect a geometry of the target 104. As an example, the at least one CV algorithm can detect the outer diameter 302 and the inner diameter 304 of the heat shield 301 for the least one image. The at least one image can be a first image acquired at a first time (e.g., $t_0$) under first operating conditions. In further embodiments, the at least one CV algorithm can be configured to identify an erosion limit 318 with respect to the geometry of the target 104.

In operation 210, the controller 110 can segment the feature of interest within each of the at least one image. For the purpose of discussion, the feature of interest will be assumed to be erosion 116. As an example, the segmentation can characterize each pixel of the at least one image as being a region with no erosion, a region with erosion of the TBC, or a region with erosion of the substrate.

Embodiments of at least one CV algorithm can adopt a variety of configurations. In an embodiment, the at least one CV algorithm can be a traditional CV algorithm. That is, the at least one CV algorithm is not a deep learning algorithm. Embodiments of the at least one CV algorithm can be configured to perform operations including, but are not limited to, at least one of feature extraction, thresholding, and edge detection. The at least one CV algorithm can further configured to perform operations such as pixel erosion (removal of pixels on the boundaries of objects in the image) and/or pixel dilation (addition of pixels to the boundaries of objects in the image). In an alternative embodiment, the at least one CV algorithm can be a deep learning algorithm configured to perform at least one of object detection, semantic segmentation, or instance segmentation.

Figure 3B:
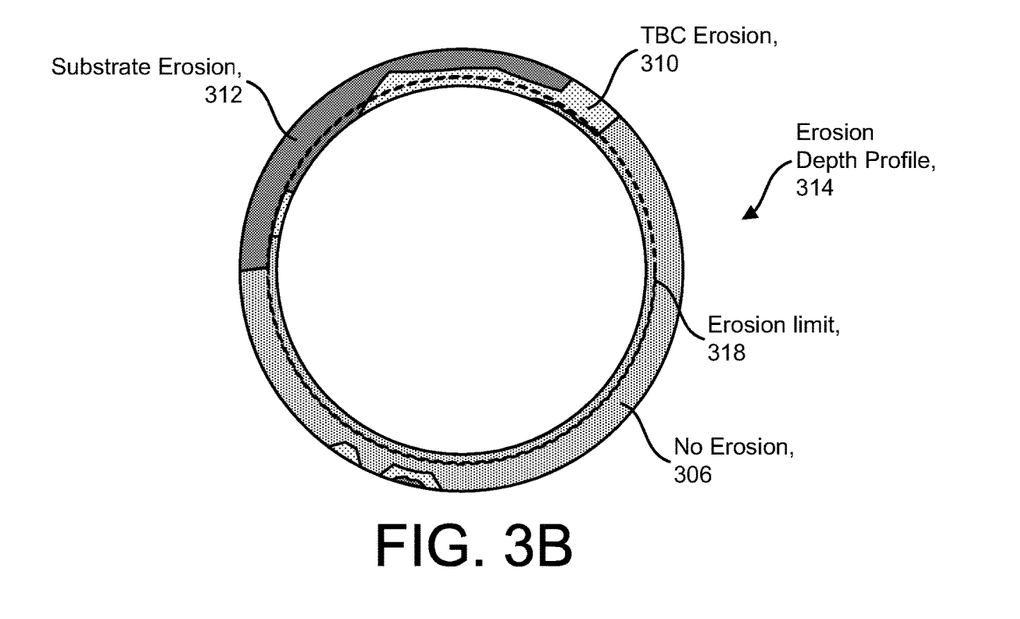
FIG. 3B is a schematic diagram illustrating an erosion depth profile for the heat shield determined by the at least one computer vision algorithm.

In operation 212, the controller 110 can generate an erosion depth profile 314 for the at least one image. An example of the erosion depth profile 314 is illustrated in FIG. 3B. As shown, the erosion depth profile 314 characterizes a depth of erosion (e.g., no erosion 306, a TBC erosion 310, and/or substrate erosion 312) between a first surface (e.g., the outer diameter 302) and a second surface (e.g., the inner diameter 304).

In operation 214, the controller 110 can output the generated erosion depth profile 314. As an example, the erosion depth profile 314 can be output to the user computing device 112 or another external computing device for storage and/or display.

In certain embodiments, the controller 110 can further output an alarm or indication based upon the generated erosion depth profile 314. As discussed above, the at least one CV algorithm can be configured identify the erosion limit 318 with respect to the geometry of the target 104. As an example, the erosion limit 318 can be a predetermined radial distance (a threshold depth in the radial direction) from the outer diameter 302. That is, the erosion limit 318 can be a depth of erosion at which the target 104 is considered to be compromised by erosion and require repair or replacement. Accordingly, the at least one CV algorithm can identify the erosion limit 318 with respect to the outer diameter 302 or inner diameter 304.

Subsequently, the controller 110 can compare the generated erosion depth profile 314 for the at least one image to the threshold depth. Under circumstances where the generated erosion depth profile 314 is greater than the predetermined threshold, the controller 110 can output an alarm or indication. The alarm or indication can be output to the user computing device and configured to generate an audible and/or visual annunciation (e.g., alphanumeric text, audible sounds, an indicator light or light pattern, etc.).

The depth profile can be considered to be greater than the predetermined threshold in a variety of ways. In one aspect, the depth of erosion can be greater than the erosion limit 318 at a single radial position. In another aspect, the depth of erosion can be greater than the erosion limit 318 over a predetermined radial length or area of the target.

The method 250 for generating the erosion depth profile predictions is illustrated in FIG. 2B. The method 250 can employ operations 202-212. In this context, the at least one image is at least two images selected from the plurality of images 114 including the first image acquired at the first time (e.g., $t_0$) under first operating conditions and a second image acquired at a second time (e.g., $t_1$) under second operating conditions. The second time $t_1$ is after the first time $t_0$. Thus, the operations 202-212 can be performed for the at least two images to generate respective erosion depth profiles at the first time $t_0$ and the second time $t_1$. Optionally, the method 250 can further include operation 214.

Thus, the method 250 continues from operation 212 or 214 to operation 252. In operation 252, the controller 110 can receive at least one operating condition of the target 104 corresponding to the at least two selected images. The at least one operating condition can be any condition that influences the erosion of the target 104. Examples of operating conditions can include, but are not limited to, number of cycles, runtime, load, temperature, other operating conditions associated with the target 104, or any combination thereof.

Number of cycles can be measured based upon any cyclic phenomenon. Examples can include, but are not limited to, power cycling (on/off), load cycling, temperature cycling, a predetermined duration of operation, start to finish of a predetermined function, etc.

Runtime can be a duration of time of operation from a predetermined start time. The start time can adopt a variety of configurations. In one aspect, the start time can be the initial operation of the machine including the target. Thus, in this example, the runtime can be a cumulative operating time over the life of the machine. In another aspect, the start time can be the last time the target is inspected. Thus, in this example, the runtime can be a cumulative operating time since last inspection of the machine.

In operation 254, the controller 110 can generate an erosion depth profile prediction using the at least one machine learning algorithm. The predicted erosion depth profile can characterize a depth of erosion predicted between the first surface of the target 104 (e.g., the outer diameter 302) and the inner diameter of the target 104 (e.g., the inner diameter 304) at a third time $t_m$. The third time $t_m$ can be after the second time $t_1$.

Figure 4:
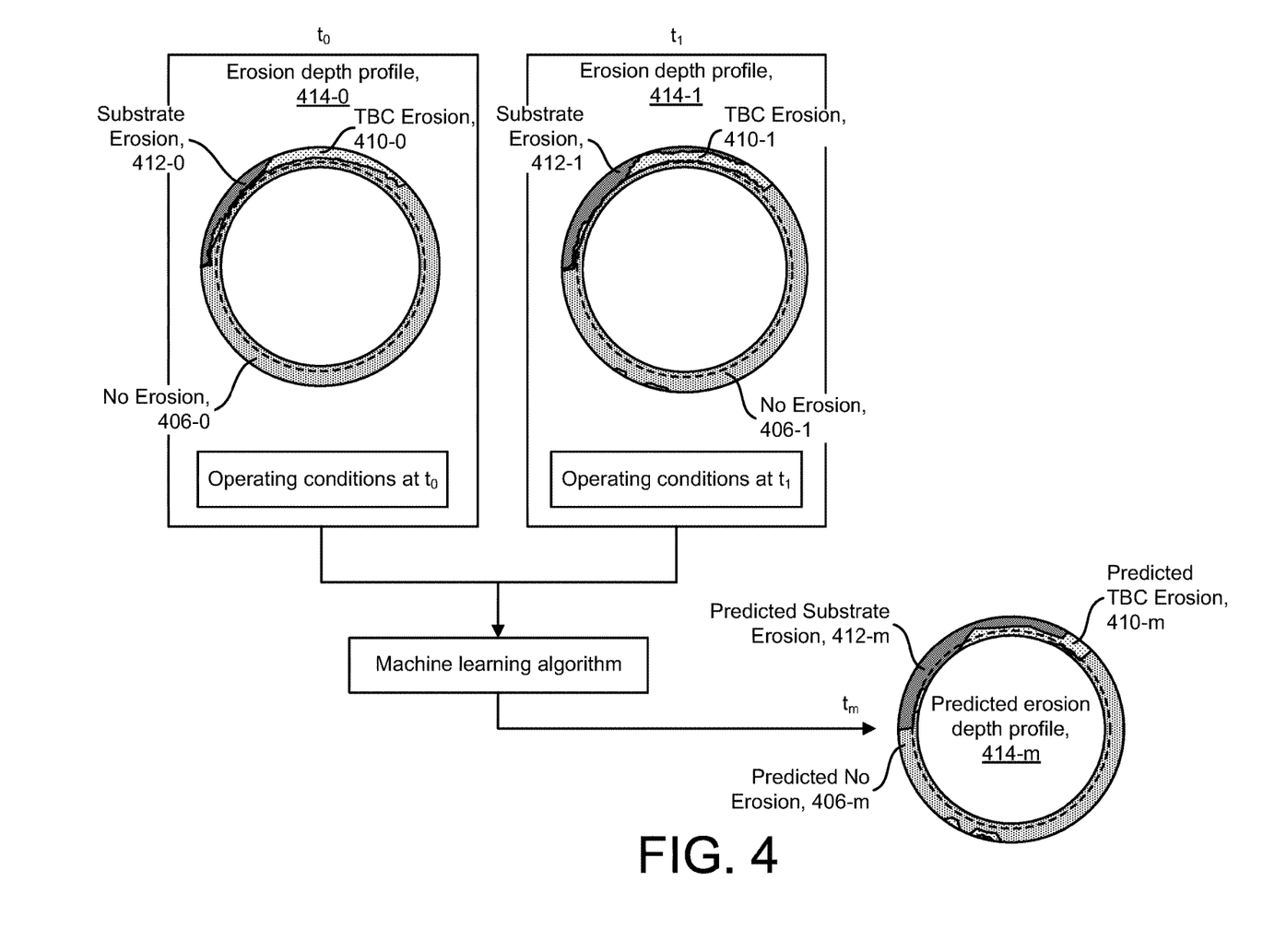
FIG. 4 is a schematic diagram illustrating prediction of an erosion depth profile at a future time by a machine learning algorithm based on prior erosion depth profiles at different times (e.g., $t_0$, $t_1$) and corresponding operating conditions.

The at least one machine learning algorithm can generate the erosion depth profile prediction based upon the erosion depth profile 314 of the at least two selected images and their corresponding operating conditions. For example, FIG. 4 illustrates two erosion depth profiles: an erosion depth profile 314-0 determined for the first image captured at time $t_0$ and an erosion depth profile 314-1 determined for the second image captured at time $t_1$. The erosion depth profile 314-0 includes a region of no erosion (renamed 406-0), a region of TBC erosion (renamed 410-0), and a region of substrate erosion (renamed 412-0). The erosion depth profile 314-1 includes a region of no erosion 406-1, a region of TBC erosion 410-1, and a region of substrate erosion 412-1. It can be appreciated that at the later time $t_1$, the region of TBC erosion 410-1 and the region of substrate erosion 412-1 is larger as compared to the region of TBC erosion 410-0 and the region of substrate erosion 412-0 at time $t_0$, reflecting growth of erosion over time. The operating conditions can be measured directly by the inspection device, received from another computing device (e.g., a control system or monitoring system for the machine including the target), or combinations thereof.

Embodiments of the at least one machine learning CV algorithm can adopt a variety of configurations. As an example, the at least one machine learning algorithm can be a remaining useful life model, support vector regression, or linear regression. Other machine learning algorithms can be employed without limit, as necessary.

As further shown in FIG. 4, the predicted erosion depth profile 414-$m$ at time $t_m$ includes a region of no erosion 406-$m$, a region of TBC erosion 410-$m$, and a region of substrate erosion 412-$m$. The region of TBC erosion 410-$m$ and the region of substrate erosion 412-$m$ are each larger as compared to the region of TBC erosion 410-1 and the region of substrate erosion 412-1 at time $t_1$, reflecting predicted growth of erosion over time.

In operation 256, the controller 110 can output the predicted erosion depth profile 414-$m$. Optionally, a corresponding prediction confidence level can also be output. In one aspect, the predicted erosion depth profile 414-$m$ and confidence level can be output to the user computing device 112 or another external computing device for display and/or storage.

Exemplary technical effects of the methods, systems, and devices described herein include, by way of non-limiting example to provide improved erosion detection and quantification. In another aspect, erosion prediction based upon prior inspection data is achieved. Beneficially, erosion detection and characterization can be automated and standardized, rather than relying upon subjective manual analysis, reducing the occurrence of inspection errors such as false positives or negatives. Furthermore, generated erosion depth predictions can be used to determine optimal inspection intervals. In this manner, the need to repeat erroneous inspections and/or the frequency of inspections can be reduced, optimizing the use of inspection resources and decreasing the cost of inspection.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. An inspection system, comprising:
   a camera configured to acquire at least one image of a target, the target including opposed first and second surfaces; and
   a controller including one or more processors in communication with the camera, the controller being configured to:
   receive the at least one image;
   detect, using at least one computer vision algorithm, a geometry of the target including the first surface of the target and the second surface of the target within at least one image, wherein the at least one image is acquired at a respective time under respective operating conditions;
   segment, using the at least one computer vision algorithm, erosion within the at least one image;
   generate an erosion depth profile for the at least one image, the erosion depth profile characterizing a depth of erosion of the target between the first and second surfaces;
   receive a predetermined threshold depth characterizing an erosion failure;
   compare the generated erosion depth profile for the at least one image to the threshold depth;
   output the generated erosion depth profile; and
   output an alarm or indication when the generated erosion depth profile is greater than the predetermined threshold depth.

2. The inspection system of claim 1, wherein the at least one image is at least two images including a first image acquired at a first time under first operating conditions and a second image acquired at a second time under second operating conditions, the second time being after the first time, and wherein the controller is further configured to:

detect, using the at least one computer vision algorithm, the geometry of the target within the at least two images;
segment, using the at least one computer vision algorithm, erosion within the at least two images; and
generate an erosion depth profile for the at least two images.

3. The inspection system of claim 2, wherein the controller is further configured to:
   receive the first and second operating conditions;
   generate, using a machine learning algorithm, an erosion depth profile prediction characterizing a predicted depth of erosion between the first and second surfaces at a third time after the second time based upon respective erosion depth profiles of the at least two images and their corresponding operating conditions; and
   output the erosion depth profile prediction.

4. The inspection system of claim 1, wherein the target comprises a substrate and a coating positioned on the target and wherein the controller is further configured to segment erosion of the coating and the substrate.

5. The inspection system of claim 1, wherein the target is a heat shield of a fuel nozzle, the first surface is an outer diameter of the heat shield, and the second surface is an inner diameter of the heat shield.

6. The inspection system of claim 1, wherein the computer vision algorithm is configured to perform at least one of pixel erosion or pixel dilation for at least one pixel of a plurality of pixels included in the at least one image.

7. The inspection system of claim 1, wherein the computer vision algorithm is configured to perform at least one of feature extraction, thresholding, or edge detection.

8. The inspection system of claim 1, wherein the computer vision algorithm is a deep learning algorithm configured to perform at least one of object detection, semantic segmentation, or instance segmentation.

9. The inspection system of claim 1, further comprising a borescope including the camera and the controller.

10. A method of inspecting a target, comprising:
    capturing, by a camera of an inspection system, at least one image of a target, the target including opposed first and second surfaces;
    receiving by one or more processors in communication with the camera, the at least one image;
    detecting, by the one or more processors using at least one computer vision algorithm, a geometry of the target including the first surface of the target and the second surface of the target within at least one image, wherein the at least one image is acquired at a respective time under respective operating conditions;
    segmenting, by the one or more processors using the at least one computer vision algorithm, erosion within the at least one image;
    generating, by the one or more processors, an erosion depth profile for the at least one image, the erosion depth profile characterizing a depth of erosion of the target between the first and second surfaces;
    receiving, by the one or more processors, a predetermined threshold depth characterizing an erosion failure;
    comparing, by the one or more processor, the generated erosion depth profile for the at least one image to the threshold depth;
    outputting, by the one or more processors, the generated erosion depth profile; and outputting, by the one or more processors, an alarm or indication when the generated erosion depth profile is greater than the predetermined depth threshold.

11. The method of claim 10, wherein the at least one image is at least two images including a first image acquired at a first time under first operating conditions and a second image acquired at a second time under second operating conditions, the second time being after the first time, and wherein the method further comprises, by the one or more processors:
  detecting, using the at least one computer vision algorithm, the geometry of the target within the at least two images;
  segmenting, using the at least one first computer vision algorithm, erosion within the at least two images; and
  generating an erosion depth profile for the at least two images.

12. The method of claim 11, further comprising:
  receiving, by the one or more processors, the first and second operating conditions;
  generating, by the one or more processors using a machine computer vision algorithm, an erosion depth profile prediction characterizing a predicted depth of erosion between the first and second surfaces at a third time after the second time based upon the erosion depth profile of the at least two images and their corresponding operating conditions; and
  outputting the erosion depth profile prediction.

13. The method of claim 10, wherein the target comprises a substrate and a coating positioned on the target and wherein the method further comprises segmenting, using the at least one computer vision algorithm, erosion of the coating and the substrate.

14. The method of claim 10, wherein the target is a heat shield of a fuel nozzle, the first surface is an outer diameter of the heat shield, and the second surface is an inner diameter of the heat shield.

15. The method of claim 10, wherein the computer vision algorithm is configured to perform at least one of pixel erosion or pixel dilation of at least one pixel of a plurality of pixels included in the at least one image.

16. The method of claim 10, wherein the computer vision algorithm is configured to perform at least one of feature extraction, thresholding, or edge detection.

17. The method of claim 10, wherein the computer vision algorithm is a deep learning algorithm configured to perform at least one of object detection, semantic segmentation, or instance segmentation.

18. The method of claim 10, wherein the inspection device is a borescope comprising the camera and the controller.

* * * * *